US008055918B2

United States Patent
McKenney et al.

(10) Patent No.: US 8,055,918 B2
(45) Date of Patent: *Nov. 8, 2011

(54) OPTIMIZING PREEMPTIBLE READ-COPY UPDATE FOR LOW-POWER USAGE BY AVOIDING UNNECESSARY WAKEUPS

(75) Inventors: Paul E. McKenney, Beaverton, OR (US); Joshua A. Triplett, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 888 days.

This patent is subject to a terminal disclaimer.

(21) Appl. No.: 12/061,819

(22) Filed: Apr. 3, 2008

(65) Prior Publication Data

US 2009/0254764 A1 Oct. 8, 2009

(51) Int. Cl.
*G06F 1/26* (2006.01)
(52) U.S. Cl. .................................. 713/300; 713/323
(58) Field of Classification Search .................. 713/300, 713/323
See application file for complete search history.

(56) References Cited

U.S. PATENT DOCUMENTS

| | | | |
|---|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,886,162 B1 | 4/2005 | McKenney |
| 6,996,812 B2 | 2/2006 | McKenney |
| 2005/0149634 A1 | 7/2005 | McKenney |
| 2005/0198030 A1 | 9/2005 | McKenney |
| 2006/0090104 A1 | 4/2006 | McKenney et al. |
| 2006/0100996 A1 | 5/2006 | McKenney |
| 2006/0112121 A1 | 5/2006 | McKenney et al. |
| 2006/0117072 A1 | 6/2006 | McKenney |
| 2006/0123100 A1 | 6/2006 | McKenney |
| 2006/0130061 A1 | 6/2006 | McKenney |
| 2006/0265373 A1 | 11/2006 | McKenney et al. |
| 2007/0083565 A1 | 4/2007 | McKenney |
| 2007/0101071 A1 | 5/2007 | McKenney |
| 2007/0226431 A1 | 9/2007 | McKenney et al. |
| 2007/0226440 A1 | 9/2007 | McKenney et al. |
| 2007/0266209 A1 | 11/2007 | McKenney et al. |
| 2008/0033952 A1 | 2/2008 | McKenney et al. |
| 2008/0040720 A1 | 2/2008 | McKenney et al. |

OTHER PUBLICATIONS

J. Seigh, "RCU + SMR for preemptive kernel/user threads," Linux Kernel Mailing List, May 9, 2005, 2 pages.
M. Michael, "Hazard Pointers: Safe Memory Reclamation for Lock-Free Objects," IEEE Transactions on Parallel and Distributed Systems, Jun. 2004, vol. 15, No. 6, pp. 491-504.
D. Sarma et al., "Making RCU Safe for Deep Sub-Millisecond Response Realtime Applications," 2004 USENIX (UseLinux track) Jun. 2004, 9 pages.
P. McKenney, "RCU vs. Locking Performance on Different CPUs," 2004 Linux.conf.au, 2004, 18 pages.

(Continued)

*Primary Examiner* — Nitin Patel
(74) *Attorney, Agent, or Firm* — Walter W. Duft (57) ABSTRACT

A technique for low-power detection of a grace period for deferring the destruction of a shared data element until pre-existing references to the data element have been removed. A grace period processing action is implemented that requires a response from a processor that may be running a preemptible reader of said shared data element before further grace period processing can proceed. A power and reader status of the processor is also determined. Grace period processing may proceed despite the absence of a response from the processor if the power and reader status indicates that an actual response from the processor is unnecessary.

20 Claims, 7 Drawing Sheets

OTHER PUBLICATIONS

P. McKenney et al., "Scaling dcache with RCU," Linux Journal, Jan. 1, 2004, 12 pages.
P. McKenney et al., "Using RCU in the Linux 2.5 Kernel," Linux Journal, Oct. 1, 2003, 11 pages.
P. McKenney et al.,"Read-Copy Update," 2002 Ottawa Linux Symposium, Jul. 8, 2002, 28 pages.
H. Linder et al., "Scalability of the Directory Entry Cache," 2002 Ottawa Linux Symposium, Jun. 26, 2002, pp. 289-300.
P. Mckenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design and Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
"Priority Inversion," Wikipedia, Feb. 4, 2007, 3 pages.
McKenney, "Seven real-time Linux approaches (Part C)", LinuxDevices.com, Jun. 7, 2005, 13 pages.
P. McKenney, " RCU and CONFIG_PREEMPT_RT progress," Linux Kernel Mailing List, May 5, 2005, 2 pages.
O. Nesterov, QRCU: 'Quick' SRCU Implementation, Linux Kernel Mailing List, Dec. 1, 2005, 3 pages.
T. Gleixner, "High Resolution Timers/Dynamic Ticks-V2", LWN.net, Oct. 1, 2006, 6 pages.
P. Mckenney, "Sleepable RCU", LWN.net, Oct. 9, 2006, 10 pages.
O. Nesterov, "cpufreq_tsc() as core_initcall_sync", LKML.org, Nov. 19, 2006, 2 pages.
P. McKenney, "Using RCU in the Linux 2.5 Kernel", Kernel Korner, Oct. 1, 2003,11 pages.
A. Kleen, "How to do nothing efficiently or better laziness: No Idle tick on x86-64", 2005, 16 pages.
P. McKenney, "Read-Copy Update Implementations", 2001, 3 pages.
Non-Final Office Action dated Apr. 1, 2011 from copending U.S. Appl. No. 12/178,752.
Amendment and Response to Office Action dated Jul. 1, 2011 from copending U.S. Appl. No. 12/178,572.

OPTIMIZING PREEMPTIBLE READ-COPY UPDATE FOR LOW-POWER USAGE BY AVOIDING UNNECESSARY WAKEUPS

BACKGROUND OF THE INVENTION

1. Field of the Invention

The present invention relates to computer systems and methods in which data resources are shared among concurrent data consumers while preserving data integrity and consistency relative to each consumer. More particularly, the invention concerns an implementation of a mutual exclusion mechanism known as "read-copy update" in a preemptive real-time computing environment with processors capable of assuming low-power states.

2. Description of the Prior Art

By way of background, read-copy update is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to multiprocessor computing environments in which the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. These other read operations will never see the stale data and so the updater does not need to be concerned with them. However, the updater does need to avoid prematurely removing the stale data being referenced by the first group of read operations. Thus, in the second (deferred update) phase, the old data state is only removed following a "grace period" that is long enough to ensure that the first group of read operations will no longer maintain references to the pre-update data.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables.

Figure 1A:
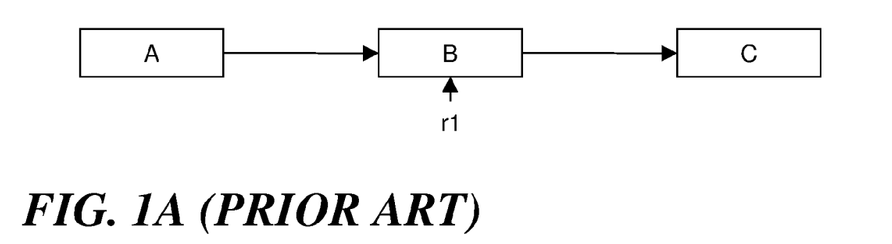
FIGS. 1A-1D are diagrammatic representations of a linked list of data elements undergoing a data element replacement according to a conventional read-copy update mechanism.
Figure 1B:
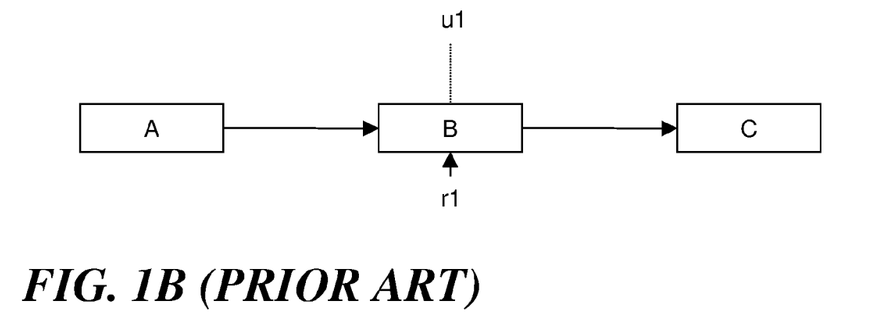
Figure 1C:
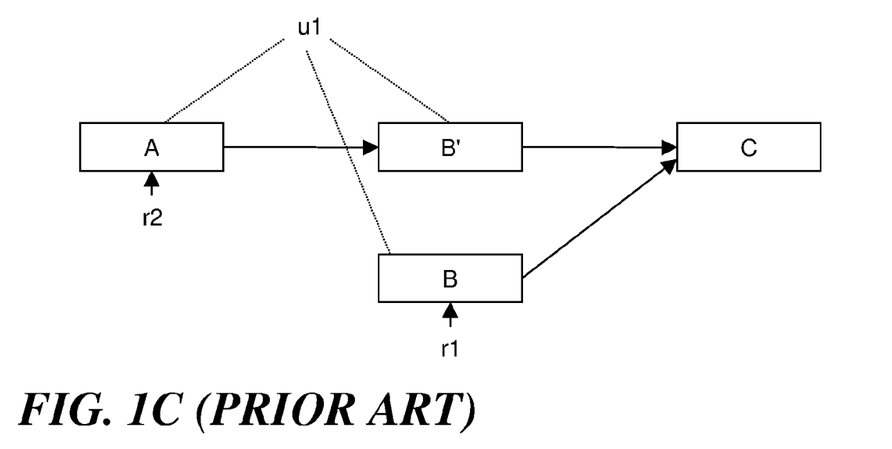

It is assumed that the data element list of FIGS. 1A-1D is traversed (without locking) by multiple concurrent readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock, allocating new memory for B', copying the contents of B to B', modifying B' as needed, updating the pointer from A to B so that it points to B', and releasing the lock. As an alternative to locking, other techniques such as non-blocking synchronization or a designated update thread could be used to serialize data updates. All subsequent (post update) readers that traverse the linked list, such as the reader r2, will see the effect of the update operation by encountering B'. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays.

Figure 1D:
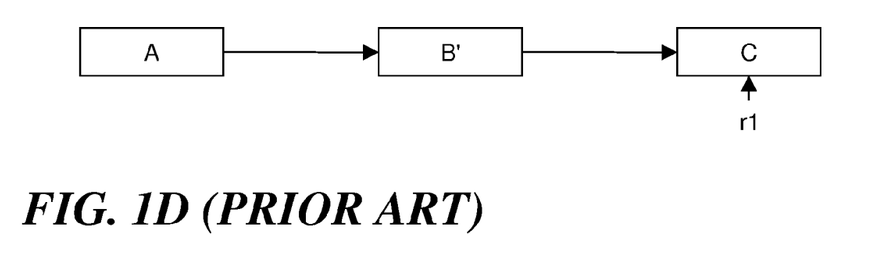

At some subsequent time following the update, r1 will have continued its traversal of the linked list and moved its reference off of B. In addition, there will be a time at which no other reader process is entitled to access B. It is at this point, representing expiration of the grace period referred to above, that u1 can free B, as shown in FIG. 1D.

Figure 2A:
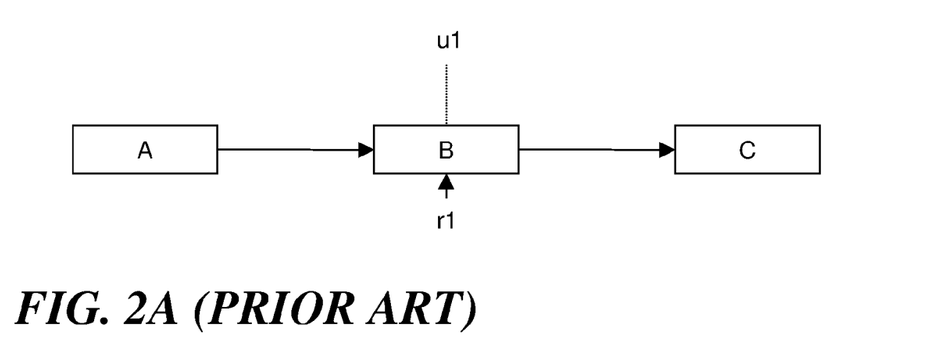
FIGS. 2A-2C are diagrammatic representations of a linked list of data elements undergoing a data element deletion according to a conventional read-copy update mechanism.
Figure 2B:
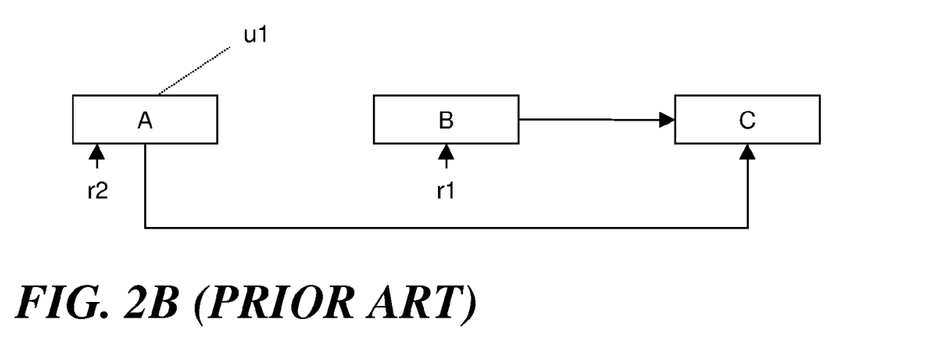
Figure 2C:
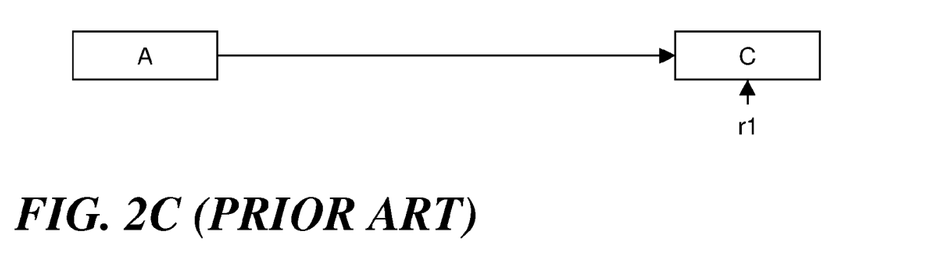

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following expiration of the grace period.

In the context of the read-copy update mechanism, a grace period represents the point at which all running processes (or threads within a process) having access to a data element guarded by read-copy update have passed through a "quiescent state" in which they can no longer maintain references to the data element, assert locks thereon, or make any assumptions about data element state. By convention, for operating system kernel code paths, a context (process) switch, an idle loop, and user mode execution all represent quiescent states for any given CPU running non-preemptible code (as can other operations that will not be listed here). In some read-copy update implementations adapted for preemptible readers, all read operations that are outside of an RCU read-side critical section are quiescent states.

Figure 3:
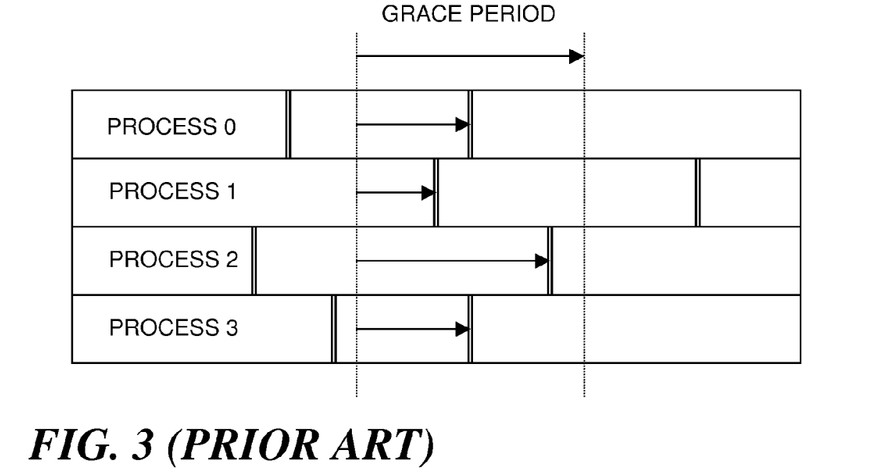
FIG. 3 is a flow diagram illustrating a grace period in which four processes pass through a quiescent state.

In FIG. 3, four processes 0, 1, 2, and 3 running on four separate CPUs are shown to pass periodically through quiescent states (represented by the double vertical bars). The grace period (shown by the dotted vertical lines) encompasses the time frame in which all four processes have passed through one quiescent state. If the four processes 0, 1, 2, and 3 were reader processes traversing the linked lists of FIGS. 1A-1D or FIGS. 2A-2C, none of these processes having reference to the old data element B prior to the grace period could maintain a reference thereto following the grace period. All post grace period searches conducted by these processes would bypass B by following the links inserted by the updater.

There are various methods that may be used to implement a deferred data update following a grace period, including but not limited to the use of callback processing as described in commonly assigned U.S. Pat. No. 5,442,758, entitled "System And Method For Achieving Reduced Overhead Mutual-Exclusion And Maintaining Coherency In A Multiprocessor System Utilizing Execution History And Thread Monitoring." Another commonly used technique is to have updaters block (wait) until a grace period has completed.

It will be appreciated from the foregoing discussion that the fundamental operation of the read-copy update (RCU) synchronization technique entails waiting for all readers associated with a particular grace period to complete. Multiprocessor implementations of RCU must therefore observe or influence the actions performed by other processors. Preemptible variants of RCU, including several real-time RCU implementations, "Sleepable" RCU (SRCU), and "Quick" SRCU (QRCU), rely on explicit actions taken by processors executing readers when they enter and leave read-side critical sections. The RCU implementation may need to coordinate with these processors to ensure orderly grace period processing. Moreover, the RCU implementation may choose to force the other processors to perform the necessary actions as soon as possible rather than waiting. This may occur if the RCU implementation decides that it has waited too long or that it has too many waiters.

RCU implementations used for preemptible readers do not currently account for processor power states. Modern processors benefit greatly from low-power states (such as, on Intel® processors, the CIE halt state, or the C2 or deeper halt states). These low-power states have higher wakeup latency, so processors and operating systems do not choose to enter these states if frequently forced to wake up. Operating systems with mechanisms such as the dynamic tick framework (also called "dyntick" or "nohz") in current versions of the Linux® kernel can avoid the need for regular timer interrupts (a frequent cause of unnecessary wakeups) and instead only wake up processors when they need to perform work, allowing for better utilization of low-power states. Thus, RCU implementations that force other processors to wake up and perform work can lead to higher power usage on processors with low-power higher-latency states. This may result in decreased battery life on battery-powered systems (such as laptops and embedded systems), higher power usage (particularly problematic for large data centers), increased heat output, and greater difficulty achieving compliance with various standards for environmentally friendly or "green" systems. It would thus be desirable to avoid unnecessary wakeups during RCU grace period processing.

It is to addressing the foregoing that the present invention is directed. In particular, what is required is a read-copy update technique that may be safely used in a preemptible reader computing environment while supporting the use of low-power processor states. These requirements will preferably be met in a manner that avoids excessive complexity of the grace period detection mechanism itself.

SUMMARY OF THE INVENTION

The foregoing goals are met and an advance in the art is obtained by a method, system and computer program product for low-power detection of a grace period for deferring the destruction of a shared data element until pre-existing references to the data element have been removed. A grace period processing action is implemented that requires a response from a processor that may be running a preemptible reader of said shared data element before further grace period processing can proceed. A power and reader status of the processor is also determined. Grace period processing may proceed despite the absence of a response from the processor if the power and reader status indicates that an actual response from the processor is unnecessary.

According to exemplary disclosed embodiments, the processor may be designated as having provided the response upon the power and reader status indicating that 1) the processor has remained in a low-power state without reader execution since the grace period processing action, or 2) the processor has passed through or entered a low-power state without reader execution since the grace period processing action, or 3) the processor has entered an execution state that is tantamount to the response being provided. The processing history may be determined by determining an initial power and reader status when the grace period processing action is taken and comparing the initial power and reader status to a current power and reader status. The initial power and reader status and the current power and reader status may include the processor being in either of 1) a non-low-power state or a low-power state with concurrent reader processing, or 2) a low-power state without concurrent reader processing. The initial power and reader status and the current power and reader status may be determined from a free-running counter maintained by the processor that is incremented when the processor enters or leaves a low-power state, or enters or leaves a reader processing state while in a low-power state. The low-power state may correspond to the processor being in a dynamic tick timer mode and the low-power reader processing state may correspond to the processor handling an interrupt in dynamic tick timer mode using a reader.

BRIEF DESCRIPTION OF THE DRAWINGS

The foregoing and other features and advantages of the invention will be apparent from the following more particular description of exemplary embodiments of the invention, as illustrated in the accompanying Drawings, in which.

DETAILED DESCRIPTION OF EXEMPLARY EMBODIMENTS

Figure 4:
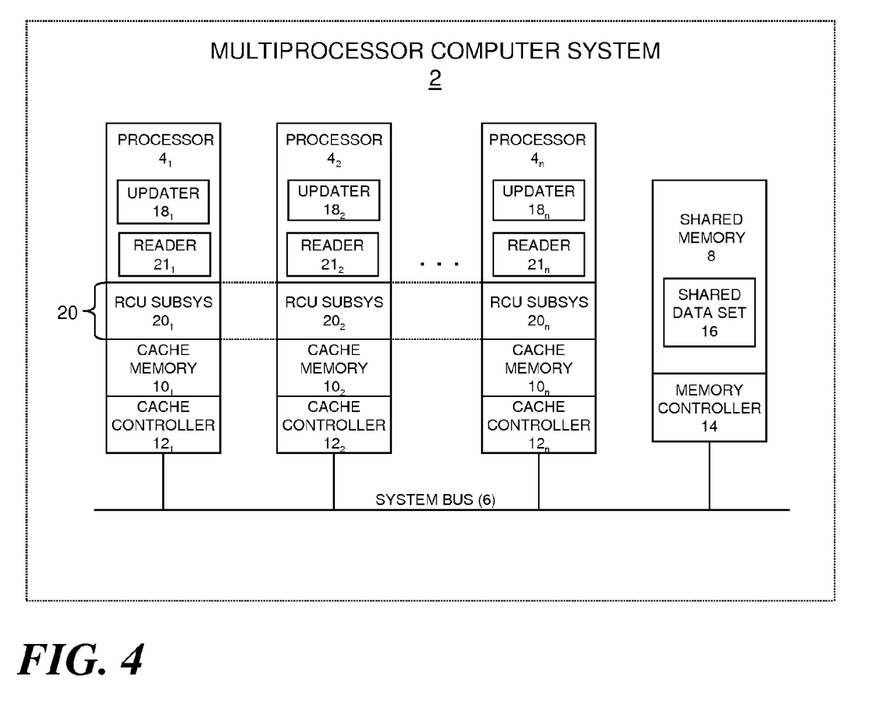
FIG. 4 is a functional block diagram showing a multiprocessor computing system that represents an exemplary environment for implementing grace period detection processing in accordance with the disclosure herein.

Turning now to the figures, wherein like reference numerals represent like elements in all of the several views, FIG. 4 illustrates an exemplary computing environment in which the low-power techniques described herein may be implemented. In particular, a symmetrical multiprocessor (SMP) computing system 2 is shown in which multiple processors $4_1$, $4_2 \ldots 4_n$ are connected by way of a common system bus 6 to a shared memory 8. Respectively associated with each processor $4_1$, $4_2 \ldots 4_n$ is a conventional cache memory $10_1$, $10_2 \ldots 10_n$ and a cache controller $12_1$, $12_2 \ldots 12_n$. A conventional memory controller 14 is associated with the shared memory 8. The computing system 2 is assumed to be under the management of a single multitasking operating system adapted for use in an SMP environment.

It is further assumed that update operations executed within kernel or user mode processes, threads, or other execution contexts will periodically perform updates on a set of shared data 16 stored in the shared memory 8. Reference numerals $18_1$, $18_2 \ldots 18_n$ illustrate individual data update operations (updaters) that may periodically execute on the several processors $4_1$, $4_2 \ldots 4_n$. As described by way of background above, the updates performed by the data updaters $18_1$, $18_2 \ldots 18_n$ can include modifying elements of a linked list, inserting new elements into the list, deleting elements from the list, and many other types of operations. To facilitate such updates, the several processors $4_1$, $4_2 \ldots 4_n$ are programmed to implement a read-copy update (RCU) subsystem 20, as by periodically executing respective RCU instances $20_1$, $20_2 \ldots 20_n$ as part of their operating system or user application functions. Each of the processors $4_1$, $4_2 \ldots 4_n$ also periodically executes read operations (readers) $21_1$, $21_2 \ldots 21_n$ on the shared data 16. Such read operations will typically be performed far more often than updates, this being one of the premises underlying the use of read-copy update.

One of the functions performed by the RCU subsystem 20 is grace period processing for deferring the destruction of a shared data element until pre-existing references to the data element are removed. This processing entails starting new grace periods and detecting the end of old grace periods so that the RCU subsystem 20 knows when it is safe to free stale data elements. In order to support low-power state processor operation, the RCU subsystem 20 is adapted to avoid having to perform unnecessary wakeups of processors that are in low-power states. To that end, the RCU subsystem 20 may periodically arrange for a power status notification from the processors $4_1$, $4_2 \ldots 4_n$ as these processors enter or leave a low-power state. By way of example only, each processor $4_1$, $4_2 \ldots 4_n$ may store per-processor power status information whenever the processor enters a low-power state, such as a dynamic tick state. The power status notification allows the RCU subsystem 20 to keep track of which of the processors $4_1$, $4_2 \ldots 4_n$ are and are not in a low-power state, and avoid waking those processors if possible. Unfortunately, in some RCU implementations, a processor may have associated readers even though it is in a low-power state. One such example is found in current real-time patches of the Linuxo kernel wherein a processor in dynamic tick mode may periodically run an interrupt handler that performs RCU read operations. For convenience, such interrupts will be referred to hereinafter as "RCU interrupts." RCU interrupt handling could include, but is not necessarily limited to, servicing NMIs (Non-Maskable Interrupts) and other hardware or software events (such as SMIs (System Management Interrupts) in the event that the SMI handler implemented RCU).

The RCU subsystem 20 thus may not assume that a low-power state processor implies an absence of readers. To handle this case, when a processor $4_1$, $4_2 \ldots 4_n$ enters a low-power state, it may also provide notification to the RCU subsystem 20 if and when there is an RCU reader $21_1$, $21_2 \ldots 21_n$ (such as an RCU interrupt handler) associated with the processor. Thus, the processors $4_1$, $4_2 \ldots 4_n$ may provide both a power and reader status notification to the RCU subsystem 20. Like the power status notification, the reader status notification could be provided by each processor $4_1$, $4_2 \ldots 4_n$ storing per-processor reader status information whenever the processor has an associated reader that must be accounted for by the RCU subsystem 20, such as when the processor enters or leaves an RCU interrupt handling state.

One way that a processor could store power status and reader status information would be to manipulate a per-processor power and reader status indicator, as by incrementing a free-running progress counter to indicate both power status and reader status. A processor $4_1$, $4_2 \ldots 4_n$ could increment its progress counter whenever it enters or exists a low-power state, and also when an RCU interrupt handler is commenced and terminated (or when any other RCU reader that must be accounted for by the RCU subsystem 20 becomes associated with the processor).

By way of example, if the progress counter has an initial value of 1 corresponding to a full power state, it may be incremented to 2 when a low-power state is entered, and thereafter incremented to 3 when the full power state resumes (e.g., when a task is scheduled or an interrupt is taken). The next low-power state may increment the progress counter to 4. If the processor then takes an RCU interrupt or is otherwise assigned to handle RCU read processing, the progress counter may be incremented to 5. When the RCU interrupt handling or other RCU reader activity completes, the progress counter may be incremented to 6. A return to the full power state may then result in the progress counter incrementing to 7. It will be appreciated from the foregoing discussion that odd progress counter values represent a notification that a processor $4_1$, $4_2 \ldots 4_n$ is either at full power or is responsible for an RCU reader $21_1$, $21_2 \ldots 21_n$. Progress counter values that are even signify that a processor $4_1$, $4_2 \ldots 4_n$ is in a low-power state and does not have an associated RCU reader $21_1$, $21_2 \ldots 21_n$. Note that the foregoing assumes that a processor $4_1$, $4_2 \ldots 4_n$ will not be placed into a low-power state while an RCU reader $21_1$, $21_2 \ldots 21_n$ is in progress.

When the RCU subsystem 20 executes on a particular processor $4_1$, $4_2 \ldots 4_n$, it may periodically implement grace period processing actions that require response from the other processors in order for grace period processing to proceed. As used herein, the term "response" refers to any processing that is required to be performed on a processor $4_1$, $4_2 \ldots 4_n$ in order to support an RCU implementation. One grace period processing action that may require response from other processors is the commencement of a new grace period. In RCU implementations designed to handle preemptible readers (hereinafter referred to as "preemptible RCU"), it is essential that processors running such readers be aware when new grace periods start so that the readers are assigned to the correct grace period, and are thereby tracked correctly by the RCU implementation. Requiring that processors acknowledge the start of new grace periods (e.g., by clearing a flag) is one way to ensure this result. Another grace period processing action that may require responsive action by processors is the ending of an old grace period. Insofar as this triggers callback processing, it is important to ensure that all RCU readers associated with the ending grace period have completed. In some cases, processor design and/or compiler optimizations could result in a reader advising the RCU implementation that it has completed read-side critical section processing when in fact it has not. One way to avoid this result is to have the processor that runs the reader execute a memory barrier instruction after being advised of the end of a grace period.

In the system 2 of FIG. 4, instead of simply waking up the processors $4_1$, $4_2 \ldots 4_n$ to perform actions such as acknowledging new grace periods or implementing memory barriers at the end of old grace periods, the RCU subsystem 20 may first consult each processor's stored power and reader status information to determine the power and reader status of that processor. If the power and reader status information indicates that a processor $4_1, 4_2 \ldots 4_n$ is at full power and/or has an associated RCU reader $21_1, 21_2 \ldots 21_n$ (e.g., the processor's progress counter value is odd), the RCU subsystem 20 may rightfully ask the processor to perform the action that facilitates grace period processing. Indeed, if the processor $4_1, 4_2 \ldots 4_n$ is running an RCU reader $21_1, 21_2 \ldots 21_n$, the processor will have to respond in order to protect the reader from possible corruption and data loss. On the other hand, if the power and reader status information indicates that a processor $4_1, 4_2 \ldots 4_n$ is in a low-power state without an associated RCU reader $21_1, 21_2 \ldots 21_n$ (e.g., the processor's progress counter value is even), the RCU subsystem 20 may safely ignore the processor. It may designate the processor as having provided the response because the processor's power and reader status information indicates that an actual response from this processor is unnecessary. Due to such low-power-aware grace period processing, the processor $4_1, 4_2 \ldots 4_n$ can remain in the low-power state and need not be woken up unnecessarily, thereby conserving power while allowing grace period processing to proceed despite the absence of a response from the low-power processors. Grace periods may thus advance in orderly fashion without compromising low-power state operation.

Figure 5:
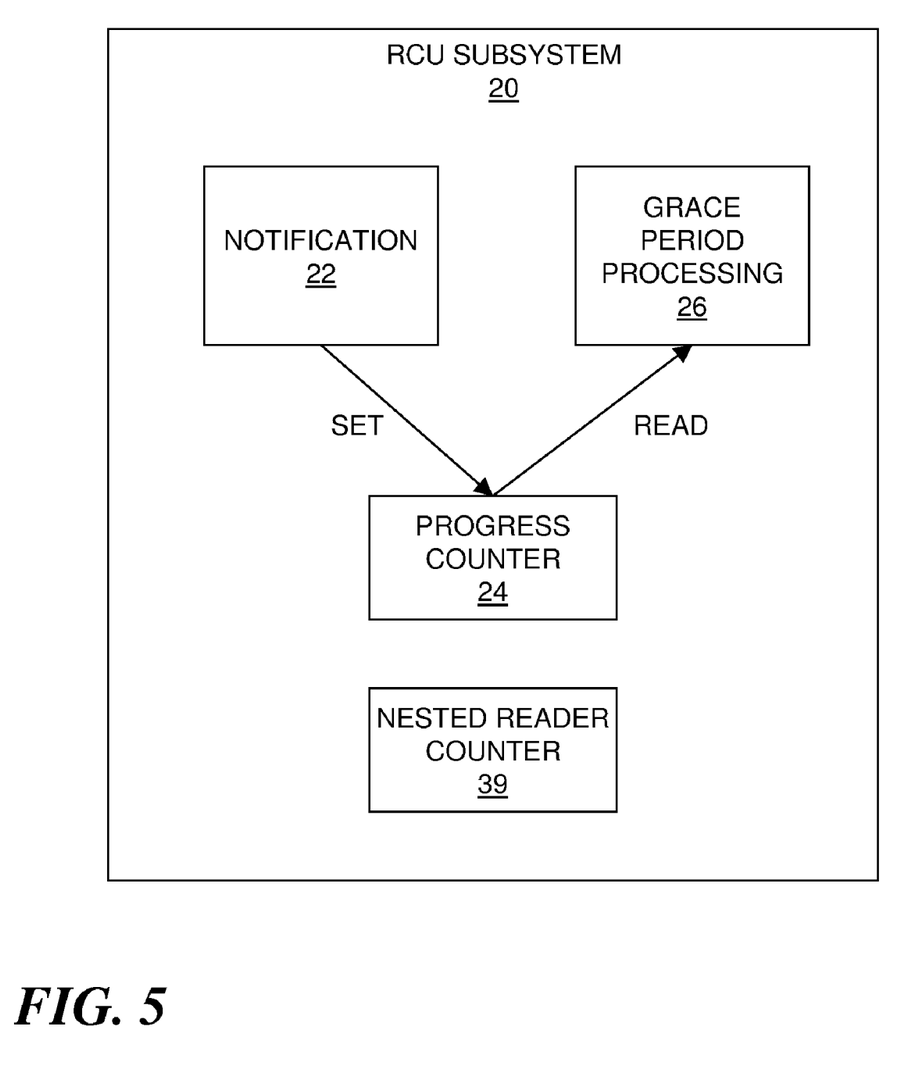
FIG. 5 is a functional block diagram showing a read-copy update subsystem implemented by each processor in the multiprocessor computer system of FIG. 4.

The foregoing processing may be implemented by logic within the RCU subsystem 20 that is shown in FIG. 5. In particular, a notification component 22 may periodically run on each processor $4_1, 4_2 \ldots 4_n$ and manipulate a per-processor progress counter 24 in response changes in processor power and reader status. A grace period processing component 26 may likewise periodically run one each processor $4_1, 4_2 \ldots 4_n$. When it does, the grace period processing component 26 may consult the progress counter 24 of all other processors $4_1, 4_2 \ldots 4_n$ whenever it implements a grace period processing action that requires a response from those processors. As described above, the grace period processing component 26 may be able to avoid unnecessary wake ups of one or more of such processors if their power and reader status is such that no actual response is required. In this way, grace period processing may proceed despite the absence of a response from the processor. The foregoing processing is illustrated in FIGS. 6 and 7.

Figure 6:
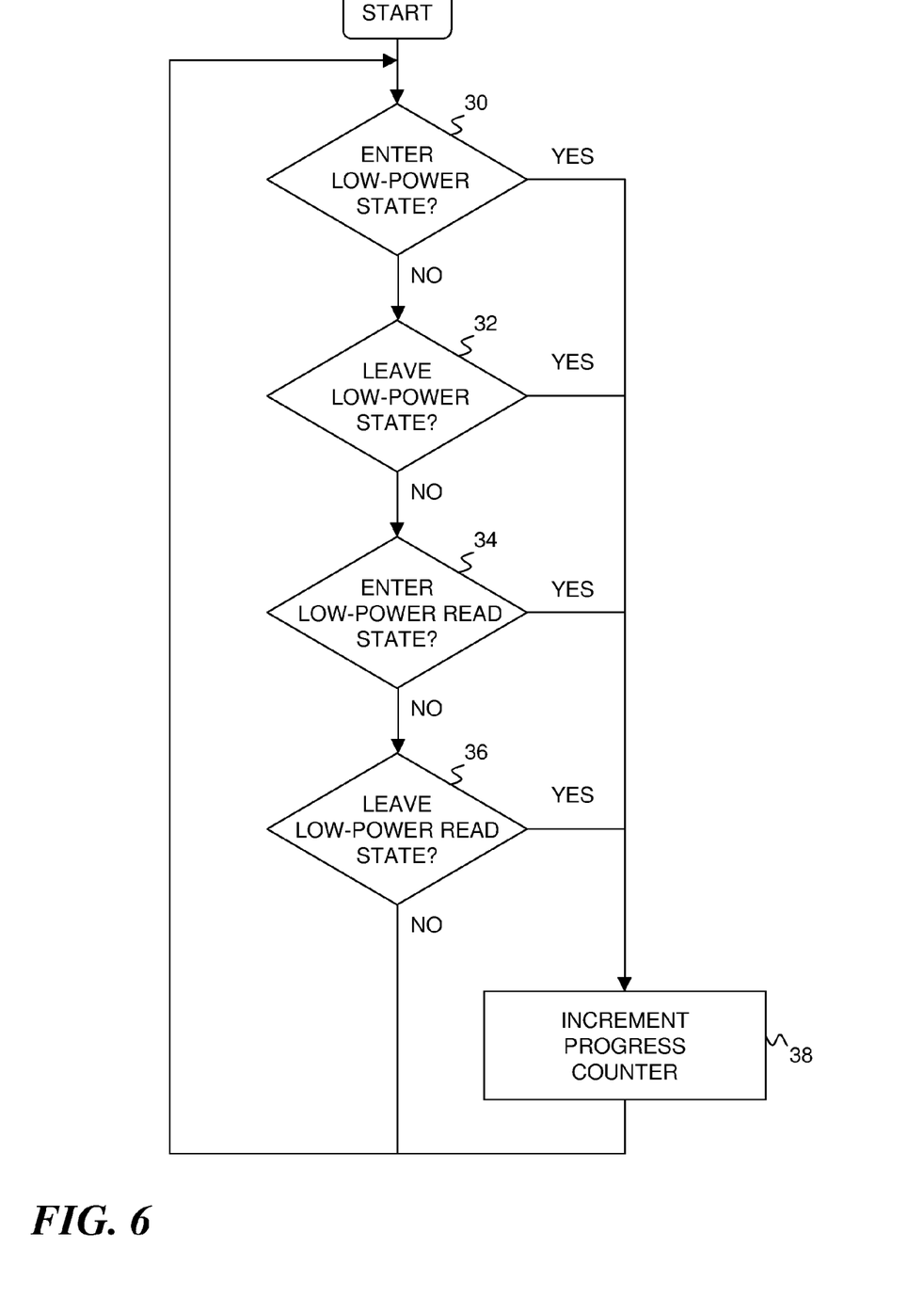
FIG. 6A is a flow diagram showing exemplary power and reader status notification processing associated with the processors of the multiprocessor computer system of FIG. 4.

FIG. 6 depicts exemplary notification processing that may be performed by the notification component 22 on all processors $4_1, 4_2 \ldots 4_n$ as they enter and leave low-power states, and as they implement an RCU reader $21_1, 21_2 \ldots 21_n$ while in low-power states. As discussed above, this could result from the processor $4_1, 4_2 \ldots 4_n$ handling an RCU interrupt while in dynamic tick mode, or otherwise being assigned RCU read-side responsibility while in a low-power state. Blocks 30, 32, 34 and 36 respectively check for entry into a low-power state, exit from a low-power state, entry into low-power RCU reader mode, and exit from low-power RCU reader mode. In block 38 the progress counter 24 is incremented when any of the conditions of blocks 30-36 are satisfied.

If desired, special handling may be implemented in connection with blocks 34 and 36 due to the possibility of nested RCU read-side operations. For example, during RCU interrupt handling, it may be possible that one or more additional RCU interrupts (e.g., NMIs or SMIs) could occur. To handle this case, a second per-processor counter 39 (see FIG. 5), which may be referred to as a nested reader counter, may be used. The nested reader counter 39 can be incremented by each RCU interrupt handler upon entry into interrupt mode and decremented upon exit. Nested RCU interrupt handlers that see the nested reader counter 39 in an incremented state would refrain from manipulating the progress counter. Additional special handling for block 34 may include implementing a memory barrier instruction following incrementation of the progress counter 24 to ensure that other processors see the correct progress counter state while RCU read-side processing is underway.

Figure 7:
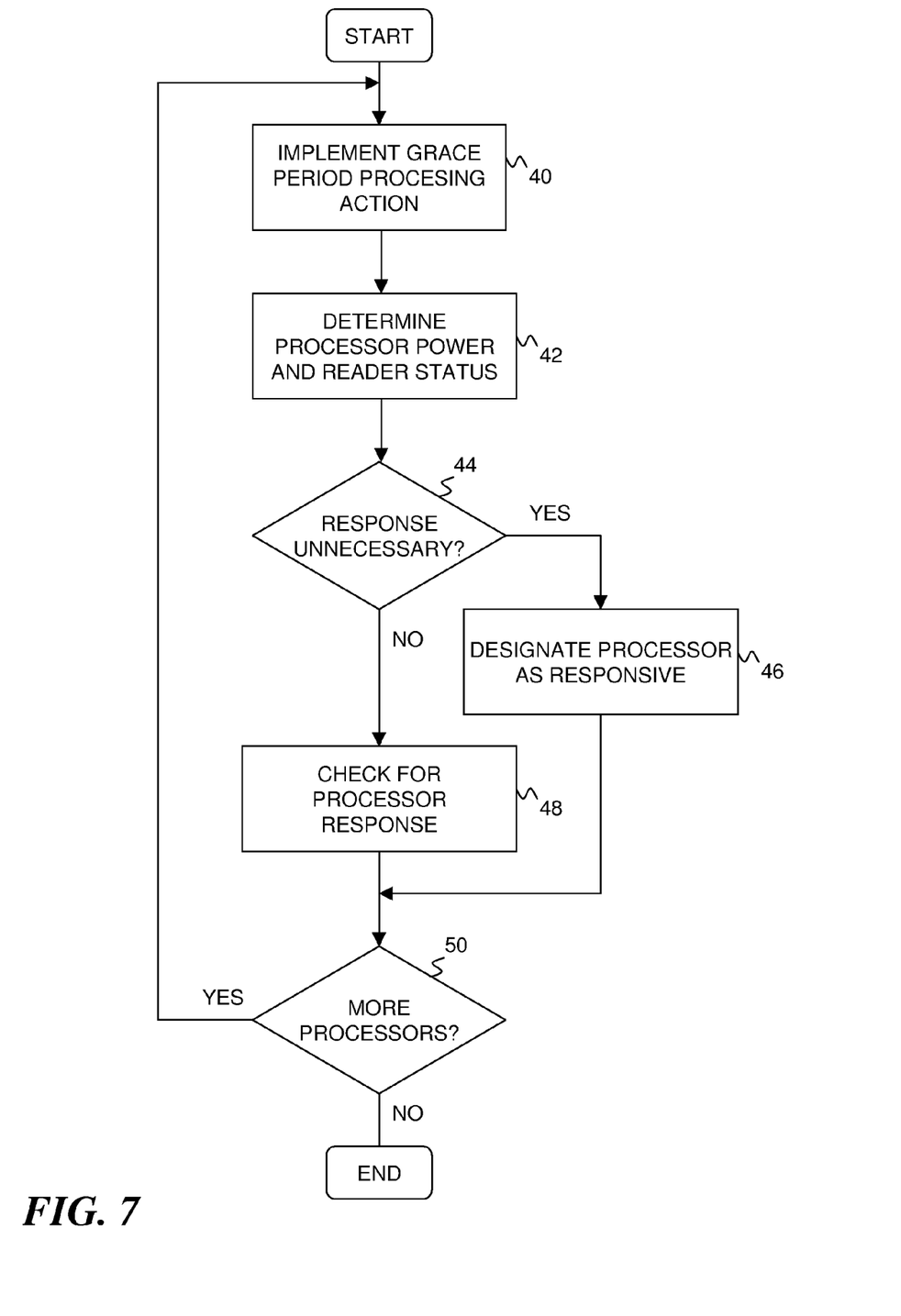
FIG. 7 is a flow diagram showing exemplary grace period processing associated with the processors of the multiprocessor computer system of FIG. 4.

FIG. 7 depicts exemplary processing that may be performed by the grace period processing component 26 as it runs on one of the processors $4_1, 4_2 \ldots 4_n$ and determines whether it needs to interact with the other processors to advance grace period processing. In block 40, the grace period processing component 26 implements a grace period processing action that requires a response from all other processor $4_1, 4_2 \ldots 4_n$ that may be running a preemptible RCU reader $21_1, 21_2 \ldots 21_n$ before further grace period processing can proceed. In block 42 the grace period processing component 26 determines a power and reader status of one of the other processors $4_1, 4_2 \ldots 4_n$. As discussed below, this may be implemented by taking a snapshot of the processor's progress counter 24 when the grace period action is first implemented, and if necessary taking a subsequent current snapshot to determine a power and reader status history of the processor $4_1, 4_2 \ldots 4_n$ being evaluated. The latter technique may be used if grace period processing is re-entrant, as in current real-time versions of the Linux® kernel wherein grace period processing is implement using a state machine called by a clock timer interrupt. In block 44 the grace period processing component determines whether the power and reader status of the processor $4_1, 4_2 \ldots 4_n$ indicates that an actual response from this processor is unnecessary. If true, block 46 designates the processor as having provided the requested response and proceeds to block 50 to evaluate the next processor, thus allowing grace period processing to proceed despite the absence of a response from the processor. If false, block 48 checks for the response and proceeds to block 50 to evaluate the next processor. Block 50 returns processing to block 44 if there are still processors $4_1, 4_2 \ldots 4_n$ that need to respond. Note that the grace period processing component 26 may periodically exit, such as on each pass through blocks 40-48 of FIG. 7. This reentrant technique may be used if the grace period processing component 26 is called on a regular basis, such as by a scheduler or a clock timer interrupt.

In the processing of FIG. 7, the grace period processing action of block 40 may include such actions as determining that a new grace period needs to be started, starting a new grace period, requesting other processors $4_1, 4_2 \ldots 4_n$ to acknowledge the start of a new grace period, detecting that a current grace period has ended, ending a current grace period, or requesting other processors to acknowledge the end of a current grace period. For example, in current real-time versions of the Linux® kernel, new grace periods are started when the RCU implementation stores a grace period indicator value that increments a grace period generation number and then sets a per-processor flag that must be cleared by the other processors before grace period processing continues. The same Linux® kernel real-time RCU implementation also sets a per-processor flag when it detects that the end of a grace period has arrived. The other processors are required to implement a memory barrier instruction and then clear this flag. As previously discussed, the memory barrier ensures that all read-side processing will have completed before callback processing can proceed. According to the disclosed technique, if a processor $4_1, 4_2 \ldots 4_n$ is in a low-power state with no RCU readers, the grace period processing component 26 could either refrain from setting the above-mentioned per-processor flags on that processor, or it could set the flags and ignore the processor's lack of response.

With continuing reference to FIG. 7, different power and reader status history criteria may be used for the processor power and reader status evaluation of block 44. In some cases, the processor $4_1, 4_2 \ldots 4_n$ may be designated as having provided the grace period processing response upon a comparison of current and initial progress counter snapshots indicating that the processor has remained in a low-power state without RCU reader execution since the grace period processing action. Logically, this power and status history may be represented by equation (1) as follows:

$$(\text{curr}==\text{snap}) \text{ AND (least significant bit of curr}==0), \quad (1)$$

where "curr" is the current progress counter snapshot and "snap" is the initial progress counter snapshot. This power and status history may be used for both of the exemplary real-time Linux® kernel grace period processing actions described above, namely, when requesting acknowledgement of the start of a new grace period and when requesting a memory barrier following the end of a grace period. In the first instance, if a processor has been in a low-power state with no RCU readers since the start of a grace period, it cannot possibly be in a state that would require acknowledgement of the new grace period. In the second instance, if a processor has been in a low-power state with no RCU readers since the end of a grace period, it cannot possibly be in a state that would require the implementation of a memory barrier.

In other cases, the processor $4_1, 4_2 \ldots 4_n$ may be designated as having provided the grace period processing response upon a comparison of current and initial progress counter snapshots indicating that the processor has passed through or entered a low-power state without reader execution since the grace period processing action. Logically, this power and status history may be represented by equation (2) as follows:

$$((\text{curr}-\text{snap})>2) \text{ OR (least significant bit of snap}==0), \quad (2)$$

where "curr" is the current progress counter snapshot and "snap" is the initial progress counter snapshot. This power and status history may be used for the first exemplary real-time Linux® kernel grace period processing action described above, namely, when requesting acknowledgement of the start of a new grace period. If the processor has passed through or entered a high power or RCU reader processing state since the beginning of the grace period, it cannot possibly be in a state that would require acknowledgement of the new grace period.

In still other cases, the processor $4_1, 4_2 \ldots 4_n$ may be designated as having provided the grace period processing response upon a comparison of current and initial power and reader snapshots indicating that the processor has entered or left a low-power RCU reader execution state. Logically, this power and status history may be represented by equation (3) as follows:

$$\text{curr}!=\text{snap}, \quad (3)$$

where "curr" is the current progress counter snapshot and "snap" is the initial progress counter snapshot. This power and status history may be used for the second exemplary real-time Linux® kernel grace period processing action described above, namely, when requesting that a memory barrier be implemented at the end of a grace period. However, in order for equation (3) to be effective, the low-power RCU reader execution state must be tantamount to the requested grace period processing response being provided. In the case of a memory barrier request, this means that the low-power RCU reader must inherently implement a memory barrier.

Recalling the discussion of FIG. 6, it was stated that additional special handling for block 34 may include implementing a memory barrier instruction following incrementation of the progress counter 24 to ensure that other processors see the correct progress counter state while RCU read-side processing is underway. Assuming such a memory barrier is always implemented by a processor $4_1, 4_2 \ldots 4_n$ during the low-power RCU read processing state of block 34 in FIG. 6, the processor cannot possibly be in a state that would require the implementation of another memory barrier at the end of a grace period.

One final aspect of the disclosed technique that is worthy of mention is that it supports the grace period processing component 26 when the latter is implemented as a state machine called by a clock timer interrupt, as in the current real-time version of the Linux® kernel. In such an implementation of the grace period processing, the grace period processing component 26 itself is responsible for both issuing grace period processing requests to other processors and for servicing those requests. In particular, the grace period processing component 26 would issue the grace period processing request on one processor, terminate at the end of the current interrupt, and then be re-invoked on the next interrupt on a different processor. The grace period processing component 26 will encounter the grace period processing request that it previously issued and take whatever responsive action is required. As indicated above, this may include a grace period coordination action such as acknowledging a new grace period or implementing a memory barrier at the end of an old grace period. If all the processors $4_1, 4_2 \ldots 4_n$ are awake, the grace period processing component 26 will make the rounds on all processors, the coordination process will complete and grace period detection will advance to the next state. One consequence of using a low-power dynamic tick mode is that the grace period processing component 26, being dependent on a clock timer interrupt, may not advance through its various states due to the absence of clock timer ticks. An advantage of the low-power technique disclosed herein is that the grace period processing component 26 need not run on processors $4_1, 4_2 \ldots 4_n$ that are in a low power dynamic tick state with no RCU readers $21_1, 21_2 \ldots 21_n$. Thus, the fact that its clock timer interrupt does not execute during dynamic tick mode is irrelevant.

Figure 8:
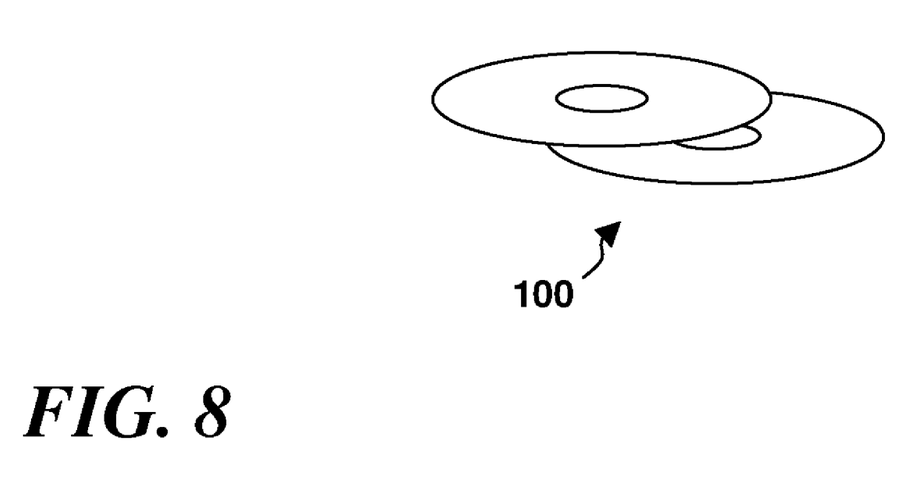
FIG. 8 is a diagrammatic illustration showing media that may be used to provide a computer program product for implementing grace period detection processing in accordance with the disclosure herein.

Accordingly, a technique for optimizing preemptible read-copy update for low-power usage has been disclosed that avoids unnecessary wakeups and facilitates grace period processing state advancement. It will be appreciated that the foregoing concepts may be variously embodied in any of a data processing system, a machine implemented method, and a computer program product in which programming logic is provided by one or more machine-useable media for use in controlling a data processing system to perform the required functions. Exemplary machine-useable media for providing such programming logic are shown by reference numeral 100 in FIG. 8. The media 100 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the programming logic of the invention, either alone or in conjunction with another software product that incorporates the required functionality, such as an operating system. The programming logic could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation medium (such as a network), or other entity that can contain, store, communicate, propagate or transport the programming logic for use by or in connection with a data processing system, computer or other instruction execution system, apparatus or device.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A method for low-power detection of a grace period for deferring the destruction of a shared data element until pre-existing references to the data element are removed, comprising:
implementing a grace period processing action that requires a response from a processor that may be running a preemptible reader of said shared data element before further grace period processing can proceed;
determining a power and reader status of said processor; and
proceeding with grace period processing without said response if said power and reader status indicates that said response is unnecessary.

2. A method in accordance with claim 1, wherein said power and reader status comprises said processor being in either of 1) a non-low-power state or a low-power state with concurrent reader processing, or 2) a low-power state without concurrent reader processing.

3. A method in accordance with claim 2, wherein said low-power state includes said processor being in a dynamic tick timer mode and wherein said low-power state with concurrent reader processing includes to said processor handling an interrupt in dynamic tick timer mode using a reader.

4. A method in accordance with claim 1, wherein said power and reader status is determined by determining an initial power and reader status when said grace period processing action is taken and comparing said initial power and reader status to a current power and reader status.

5. A method in accordance with claim 4, wherein said processor is designated as having provided said response upon said power and reader status indicating that 1) said processor has remained in a low-power state without reader execution since said grace period processing action, or 2) said processor has passed through or entered a low-power state without reader execution since said grace period processing action, or 3) said processor has entered an execution state that is tantamount to said response being provided.

6. A method in accordance with claim 1, wherein said power and reader status is determined from a power and reader status indicator maintained by said processor that is manipulated when said processor enters or leaves a low-power state, or enters or leaves a reader processing state while in a low-power state.

7. A system adapted for low-power detection of a grace period for deferring the destruction of a shared data element until pre-existing references to the data element are removed, comprising:
one or more processors;
a memory coupled to said one or more processors, said memory including a computer useable medium tangibly embodying at least one program of instructions executable by said processor to perform operations, comprising:
implementing a grace period processing action that requires a response from a processor that may be running a preemptible reader of said shared data element before further grace period processing can proceed;
determining a power and reader status of said processor; and
proceeding with grace period processing without said response if said power and reader status indicates that said response is unnecessary.

8. A system in accordance with claim 7, wherein said power and reader status comprises said processor being in either of 1) a non-low-power state or a low-power state with concurrent reader processing, or 2) a low-power state without concurrent reader processing.

9. A system in accordance with claim 8, wherein said low-power state includes said processor being in a dynamic tick timer mode and wherein said low-power state with concurrent reader processing includes to said processor handling an interrupt in dynamic tick timer mode using a reader.

10. A system in accordance with claim 7, wherein said power and reader status is determined by determining an initial power and reader status when said grace period processing action is taken and comparing said initial power and reader status to a current power and reader status.

11. A system in accordance with claim 10, wherein said processor is designated as having provided said response upon said power and reader status indicating that 1) said processor has remained in a low-power state without reader execution since said grace period processing action, or 2) said processor has passed through or entered a low-power state without reader execution since said grace period processing action, or 3) said processor has entered an execution state that is tantamount to said response being provided.

12. A system in accordance with claim 7, wherein said power and reader status is determined from a power and reader status indicator maintained by said processor that is manipulated when said processor enters or leaves a low-power state, or enters or leaves a reader processing state while in a low-power state.

13. A computer program product for low-power detection of a grace period for deferring the destruction of a shared data element until pre-existing references to the data element are removed, comprising:
one or more machine-useable non-transitory media;
logic provided by said one or more media for programming a data processing platform to operate as by:
implementing a grace period processing action that requires a response from a processor that may be running a preemptible reader of said shared data element before further grace period processing can proceed;
determining a power and reader status of said processor; and
proceeding with grace period processing without said response if said power and reader status indicates that said response is unnecessary.

14. A computer program product in accordance with claim 13, wherein said power and reader status comprises said processor being in either of 1) a non-low-power state or a low-power state with concurrent reader processing, or 2) a low-power state without concurrent reader processing.

15. A computer program product in accordance with claim 14, wherein said low-power state includes said processor being in a dynamic tick timer mode and wherein said low-power state with concurrent reader processing includes to said processor handling an interrupt in dynamic tick timer mode using a reader.

16. A computer program product in accordance with claim 13, wherein said power and reader status is determined by determining an initial power and reader status when said grace period processing action is taken and comparing said initial power and reader status to a current power and reader status.

17. A computer program product in accordance with claim 16, wherein said processor is designated as having provided said response upon said power and reader status indicating that 1) said processor has remained in a low-power state without reader execution since said grace period processing action, or 2) said processor has passed through or entered a low-power state without reader execution since said grace period processing action, or 3) said processor has entered an execution state that is tantamount to said response being provided.

18. A computer program product in accordance with claim 13, wherein said power and reader status is determined from a power and reader status indicator maintained by said processor that is manipulated when said processor enters or leaves a low-power state, or enters or leaves a reader processing state while in a low-power state.

19. A computer program product for low-power detection of a grace period for deferring the destruction of a shared data element until pre-existing references to the data element are removed, comprising:
- one or more machine-useable non-transitory media;
- logic provided by said one or more media for programming a data processing platform to operate as by:
- implementing a grace period processing action that requires a response from a processor that may be running a preemptible reader of said shared data element before further grace period processing can proceed;
- determining a power and reader status of said processor;
- proceeding with grace period processing without said response if said power and reader status indicates that said response is unnecessary;
- said power and reader status comprising said processor being in either of 1) a non-low-power state or a low-power state with concurrent reader processing, or 2) a low-power state without concurrent reader processing;
- said low-power state including said processor being in a dynamic tick timer mode and said low-power state with concurrent reader processing including said processor handling an interrupt in dynamic tick timer mode using a reader; and
- said power and reader status being determined from a power and reader status indicator maintained by said processor that is manipulated when said processor enters or leaves a low-power state, or enters or leaves a reader processing state while in a low-power state.

20. A computer program product in accordance with claim 19, wherein said power and reader status is determined by determining an initial power and reader status when said grace period processing action is taken and comparing said initial power and reader status to a current power and reader status, and wherein said processor is designated as having provided said response upon said power and reader status indicating that 1) said processor has remained in a low-power state without reader execution since said grace period processing action, or 2) said processor has passed through or entered a low-power state without reader execution since said grace period processing action, or 3) said processor has entered an execution state that is tantamount to said response being provided.

* * * * *